United States Patent [19]

Cartwright

[11] Patent Number: 4,475,808

[45] Date of Patent: Oct. 9, 1984

[54] PHOTOGRAPHIC ENLARGING EASEL

[76] Inventor: Neil B. Cartwright, 693 E. 16th St., Idaho Falls, Id. 83401

[21] Appl. No.: 357,841

[22] Filed: Mar. 15, 1982

[51] Int. Cl.³ .............................................. G03B 27/58
[52] U.S. Cl. ........................................ 355/74; 355/54
[58] Field of Search .................................... 355/54, 74

[56] References Cited

U.S. PATENT DOCUMENTS 3,290,990 12/1966 Garlick ................................ 355/54
4,155,644 5/1979 Hess .................................. 355/74 X
4,274,734 6/1981 Moss .................................... 355/74

Primary Examiner—Richard A. Wintercorn

[57] ABSTRACT

A photographic easel that will allow the exposure of four equal sized photographic images on one sheet of any of the standard sizes of photographic sheet material. These exposures are made in rapid succession without moving the easel or without composing the photographic image between each exposure. The unique principle is based on a mathamatical relationship between the width of the photographic sheet material and the adjustable width of the working area. An adjustable bar allows for the use of various sizes of photographic sheet material.

1 Claim, 8 Drawing Figures

U.S. Patent
Oct. 9, 1984
4,475,808
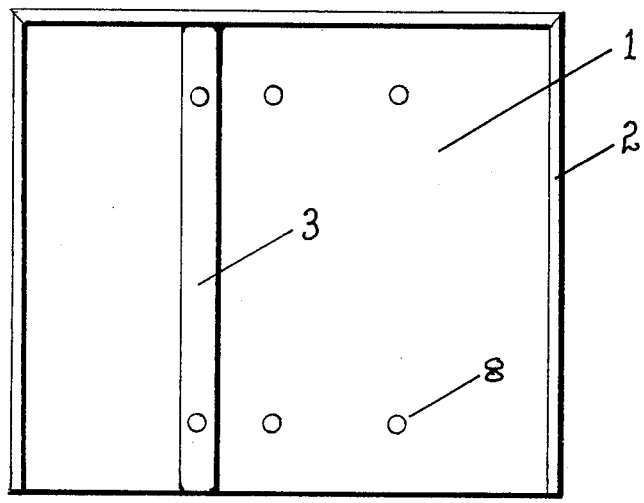
FIG. I
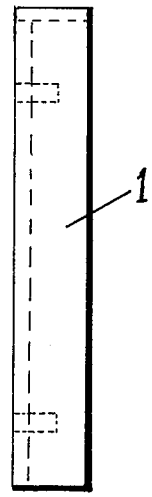
FIG. III
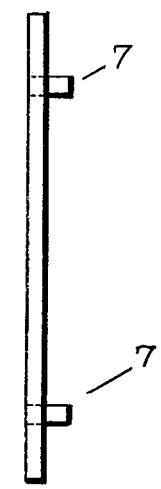
FIG. IV
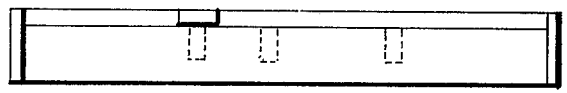
FIG. II
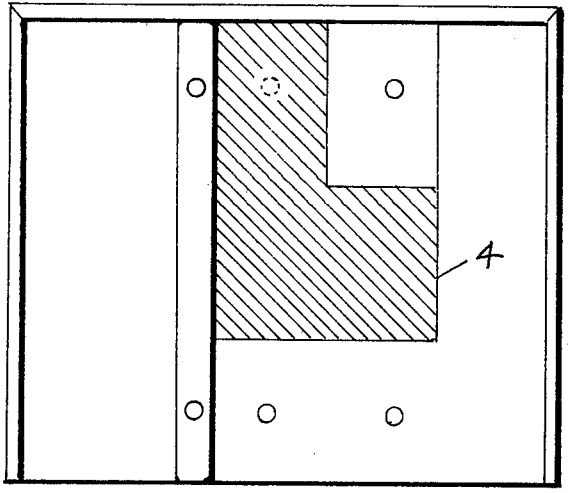
FIG. V
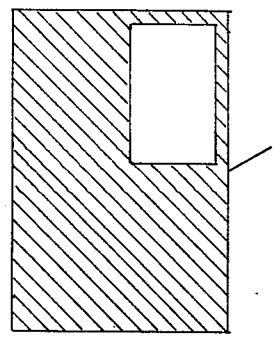
FIG. VII
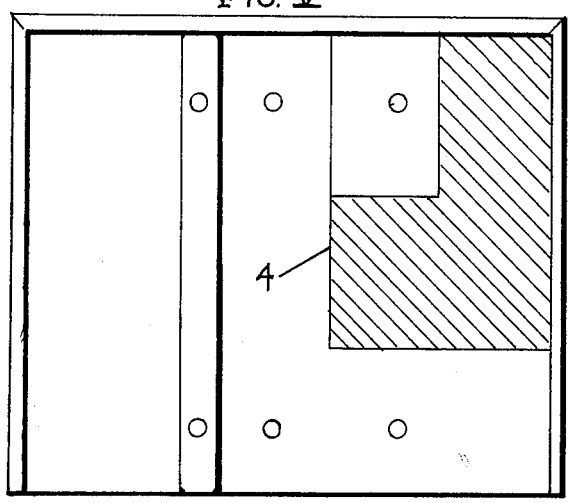
FIG. VI
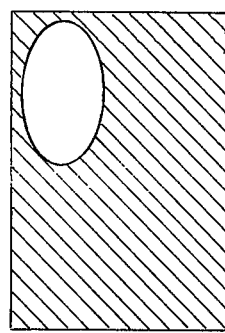
FIG. VIII

PHOTOGRAPHIC ENLARGING EASEL

SUMMARY

The exposure of multiple images on a single sheet of photographic material, by means of an enlarger, serves a useful purpose in that it facilitates subsequent processing of the photographic material.

The device, described in this disclosure, allows for the rapid exposure of four equal sized images on a single sheet of photographic material without moving the easel or without changing the position of the projected image. While there are many enlarger easels that provide the same end result, they operate on different mechanical principles and are more complex than the device outlined in this disclosure.

DESCRIPTION OF DRAWING

FIG. I is a top view of the device, showing a flat board (wood, plastic, or other material) with a frame around the top and sides, and a removable bar (with pegs) that can be positioned at specific locations on the board.

FIG. II is a front view of the device showing holes in the board for accepting the pegs on the removable bar.

FIG. III is a side view of the device showing how the pegs on the removable bar hold the bar in the desired position.

FIG. IV is a detailed drawing of the removable bar.

FIG. V is a section of the device showing how the mask and photographic sheet material are positioned for exposing one quarter of a 5×7 sheet of photographic material.

FIG. VI is a section of the device showing how the mask and the photographic sheet material are positioned for the second exposure on the same sheet of photographic material.

FIGS. VII and VIII show, respectively, a mask with a rectangular cutout and a mask with an oval cutout.

The procedure for making the third and fourth exposure is explained in the following section.

DETAILED DESCRIPTION OF DEVICE

The device consists of a flat board (1)(wood, plastic, or other material) with a frame around the top and two sides (2), and a removable bar (3) that can be positioned at strategic locations on the board. The device includes a number of opaque masks (4, 5, 6), cut in such a way as to allow the exposure of four equal sized images on a single sheet of photographic material.

The frame extends slightly above the surface of the board as shown in FIGS. II and III, so that the masks and photographic sheets can be positioned adjacent to these frames. The working model of this device accommodates masks and photographic sheets of the following sizes: 8×10, 5×7, 4×5, and 2½×3½ inches. For clarity of the description of this device, these dimensions will be used. However, the invention is not limited to these specific sizes. The device can be fabricated larger or smaller to accommodate various size masks and photographic sheets. Opaque masks are supplied as an necessary part of the device. These masks are the exact size of the photographic sheets used. For borderless prints, one corner of the mask is removed equal in size to one fourth of the entire mask (e.g. for an 8×10 mask the cutout would be 4×5 inches). For prints requiring plain or special boarders, the masks are die cut as shown in FIGS. VII and VIII, or with other design.

During operation of the device, for use with an 8×10 mask and an 8×10 sheet of photographic material, the removable bar is not used. For use with a 5×7 mask and sheet of photographic material, the removable bar is positioned as shown in FIGS. I, II, V, and VI. For use with smaller sized masks and sheets (4×5, 2½×3½), the removable bar is positioned to the right in the respective locations.

The width of each working area on the board is exactly 1½ times the width of the mask and photographic sheet to be used. For use with 8×10 sheets, the width of the working area would be 12 inches. The length of the board (top to bottom) should be large enough to accomodate the length of the largest photographic sheet used. The board of the working model was exactly 12 inches wide and ten inches long (excluding the frames). When the removable bar is placed in the 5×7 position, the width of the working area is exactly 7½ inches.

The removable bar contains two pegs (7), slightly smaller in diameter than the diameter of the holes (8) in the board. During operation of the device, the mask is first placed snugly ajacent to the frame and the bar in the upper left hand corner, as shown in FIG. V, with the opening in the top center of the working area. The projected image is now positioned and focused in this area. With the enlarger light off, the photographic sheet is now placed under the mask also adjacent to the sides of the frame and the bar in the upper left hand corner. After the first exposure, the photographic sheet is shifted to the right snug agains the top and right frame. The mask is flipped over laterally, as shown in FIG. VI, and is also placed snugly against the top and right frame. The second exposure is now made. The remaining two exposures are performed by inverting the photographic sheet (top and bottom) and repeating the steps outlined for making exposures 1 and 2. This device provides a means for making four exposures in rapid succession without changing the position of the projected image or without moving the position of the easel base. The device can be operated in total darkness, when necessary, with ease and precision.

I claim:

1. Device for exposing four equal segments of photographic sheet material by means of a photographic enlarger, without changing the position of the projected image or without moving the easel base, said device comprising:

base board with slightly raised boarders around the top and sides, opaque masks of various sizes with one fourth corner section removed for producing borderless prints, opaque masks with die cut opening in one fourth corner section for producing bordered prints or other design, a removable bar that can be placed in strategic positions on the board to accomodate the various sizes of masks and corresponding sizes of photographic paper, means of positioning the removable bar on the board so as to allow raised borders on left and right side of working area to be exactly one and one half times the dimension of the width of the photographic sheet and mask used, means of composing the photographic image for the first exposure by butting the mask against the top and left side raised borders with open quarter of mask in upper right position, means of composing image in open area of mask, means of placing photographic sheet material under said mask and making first exposure, means of flipping said mask over laterally and butting against top and right raised borders with open quarter of mask in top left position, means of shifting photographic sheet material under mask and making the second exposure, means of making the third and fourth exposure by repeating these two steps but with the photographic sheet material turned 180 degrees from top to bottom.

* * * * *